(12) United States Patent
de Kock

(10) Patent No.: US 9,982,740 B2
(45) Date of Patent: May 29, 2018

(54) SHOCK ABSORBER

(71) Applicant: KONI B.V., Oud-Beijerland (NL)

(72) Inventor: Paul de Kock, Numansdorp (NL)

(73) Assignee: KONI B.V., Oud-Beijerland (NL)

( * ) Notice: Subject to any disclaimer, the term of this patent is extended or adjusted under 35 U.S.C. 154(b) by 0 days. days.

(21) Appl. No.: 14/654,095

(22) PCT Filed: Dec. 20, 2013

(86) PCT No.: PCT/NL2013/050936
§ 371 (c)(1),
(2) Date: Jun. 19, 2015

(87) PCT Pub. No.: WO2014/104876
PCT Pub. Date: Jul. 3, 2014

(65) Prior Publication Data
US 2015/0345586 A1    Dec. 3, 2015

(30) Foreign Application Priority Data

Dec. 21, 2012   (NL) ..................................... 2010038

(51) Int. Cl.
*F16F 9/00*    (2006.01)
*F16F 9/46*    (2006.01)
(Continued)

(52) U.S. Cl.
CPC ................ *F16F 9/46* (2013.01); *F16F 9/185* (2013.01); *F16F 9/3482* (2013.01); *F16F 9/512* (2013.01); *F16F 9/516* (2013.01)

(58) Field of Classification Search
CPC .... F16F 9/512; F16F 9/516; F16F 9/46; F16F 9/185; F16F 9/3482
(Continued)

(56) References Cited

U.S. PATENT DOCUMENTS 5,129,488 A    7/1992  Furuya et al.
5,217,095 A *  6/1993  Lizell .................. B60G 17/015
                                                  188/266.5
(Continued)

FOREIGN PATENT DOCUMENTS

CN    1119223 A1    3/1996
CN    1177394 A     3/1998
(Continued)

OTHER PUBLICATIONS

International Search Report dated Apr. 10, 2014, in corresponding PCT application.
(Continued)

*Primary Examiner* — Pamela Rodriguez
(74) *Attorney, Agent, or Firm* — Young & Thompson

(57) ABSTRACT

A shock absorber includes a cylinder and a piston movable within the cylinder along a cylinder wall, the piston dividing the cylinder in a first cylinder chamber and a second cylinder chamber, which are filled with fluid. The shock absorber also includes cylinder and piston attachments for attachment to parts of a vehicle, the piston attachment and cylinder attachment moving towards one another in an inward movement and away from one another in an outward movement. Primary and auxiliary flow and valve arrangements allow fluid flow in between the first and second cylinder chambers to provide primary and auxiliary damping behavior of the shock absorber, respectively. The auxiliary flow and valve arrangement includes a first auxiliary flow and valve arrangement providing on outward movement a damping behavior showing a frequency dependency, and a second auxiliary flow and valve arrangement providing on inward movement a damping behavior showing a linear dependency.

20 Claims, 5 Drawing Sheets

(51) Int. Cl.
*F16F 9/18* (2006.01)
*F16F 9/348* (2006.01)
*F16F 9/512* (2006.01)
*F16F 9/516* (2006.01)

(58) Field of Classification Search
USPC ..... 188/313, 315, 316, 317, 322.13, 322.14, 188/322.15, 322.22; 267/64.11, 64.13, 267/64.15
See application file for complete search history.

(56) References Cited

U.S. PATENT DOCUMENTS

| | | | |
|---|---|---|---|
| 5,261,448 | A | 11/1993 | Furuya et al. |
| 5,647,097 | A | 7/1997 | Kriegler et al. |
| 5,823,305 | A | 10/1998 | Richardson et al. |
| 7,395,907 | B2 | 7/2008 | de Kock et al. |
| 8,348,027 | B2 | 1/2013 | Murakami |
| 2002/0108825 | A1* | 8/2002 | Miller ................ B60G 17/0152 188/280 |
| 2009/0078517 | A1 | 3/2009 | Maneyama |
| 2012/0160624 | A1 | 6/2012 | Katayama et al. |

FOREIGN PATENT DOCUMENTS

| | | |
|---|---|---|
| CN | 102032311 A | 4/2011 |
| DE | 40 36 613 A1 | 5/1991 |
| EP | 0 601 982 A1 | 6/1994 |
| EP | 1 231 404 A2 | 8/2002 |
| EP | 1 442 227 | 8/2004 |
| EP | 1 985 887 A2 | 10/2008 |
| WO | 03/040586 A1 | 5/2003 |

OTHER PUBLICATIONS

Chinese Search Report dated May 4, 2016, in corresponding Chinese priority application.

* cited by examiner

SHOCK ABSORBER

FIELD OF THE INVENTION

The invention relates to shock absorbers comprising a cylinder and a piston movable in the cylinder along a cylinder wall and dividing the cylinder in a first chamber and a second chamber at opposing sides of the piston, the cylinder chamber being filled with a fluid. The shock absorber comprises a flow and valve arrangement acting to allow fluid flow in between the first and second cylinder chambers such as to provide a damping behavior of the shock absorber on inward and/or outward movement of piston and cylinder with respect to one another.

BACKGROUND OF THE INVENTION

Shock absorbers of this type are generally known and used, for instance, in various sorts of vehicles, such as cars, trucks and trains, although shock absorbers are also applied in other applications. Application in cars is well known. The shock absorbers are set to a specific damping behavior by the design and implementation of the flow and valve arrangement provided in between the cylinder chambers. Such design and implementation determines important parameters governing the damping behavior. When applied in a car, the parameters may be set such as to provide a stiff damping behavior, which is often referred to as a sportive setting, or to provide a soft damping, which is often referred to as a comfortable setting. Damping of wheel and car body movements can be in conflict, especially in the comfort setting, since eigenfrequencies of car body and wheel are quite different. The eigenfrequency of a car body is about 1 Hz and of the wheel about 11 Hz, which sets different requirements for (critical) damping. On the one hand a wheel should be able to follow the road surface while driving, which requires low damping, but on the other hand the car body should better not be allowed to swing, which requires high damping.

It is desired to have a shock absorber, or damper, that can be set to both a sportive and a comfortable setting, as required or desired. Electronic controls have been proposed for influencing the damping behavior. Such electronically-controlled shock absorbers are complex, costly and susceptible to malfunction in case of failure of the electronics. It requires fast sensors, computation and control units and corresponding wiring of the various electronic parts.

SUMMARY OF THE INVENTION

It is an object of the invention to provide a shock absorber that can be easily be switched between two settings having different damping behavior, which is cost-effective and of reliable construction.

It is another or alternative object of the invention to provide a shock absorber having a sportive setting and another setting that is being experienced as very comfortable.

It is yet another or alternative object of the invention to provide a shock absorber that provides a good contact between wheel and road surface, and a good or critical damping of the care body, especially in a comfortable setting of the shock absorber.

It is yet another or alternative object of the invention to provide a shock absorber of which the damping behavior is not determined by electronic control.

At least one of these objects is achieved by a shock absorber comprising a cylinder; a piston movable within the cylinder along a cylinder wall, the piston sealing against the cylinder wall and dividing the cylinder in a first cylinder chamber at a first piston side of the piston and a second cylinder chamber at a second piston side of the piston, the second piston side opposing the first piston side, and the first and second cylinder chambers being filled with a fluid; a cylinder attachment constructed and arranged for attachment to a first part of a vehicle and connected to the cylinder; a piston attachment constructed and arranged for attachment to a second part of a vehicle and connected to the piston, the piston attachment and cylinder attachment being arranged to move towards one another on an inward movement and away from one another on an outward movement; a primary flow and valve arrangement constructed and arranged to allow fluid flow in between the first and second cylinder chambers such as to provide a primary damping behavior of the shock absorber on inward and/or outward movement; and an auxiliary flow and valve arrangement constructed and arranged to allow fluid flow in between the first and second cylinder chambers such as to provide an auxiliary damping behavior of the shock absorber on outward and inward movement, the auxiliary flow and valve arrangement comprising a first auxiliary flow and valve arrangement constructed and arranged to allow fluid flow in between the first and second cylinder chambers such as to provide a first auxiliary damping behavior of the shock absorber on outward movement, the first auxiliary damping behavior showing a frequency dependency in which a fluid flow through the first auxiliary flow and valve arrangement is dependent on a frequency component in a relative piston cylinder movement of cylinder attachment and piston attachment with respect to one another; and a second auxiliary flow and valve arrangement constructed and arranged to allow fluid flow in between the first and second cylinder chambers such as to provide a second auxiliary damping behavior of the shock absorber on inward movement, the second auxiliary damping behavior showing a substantially linear dependency in which a fluid flow through the second auxiliary flow and valve arrangement is substantially linear dependent on a velocity of the relative piston cylinder movement, and a switchable valve that can be switched between a closed position closing off fluid flow through the auxiliary flow and valve arrangement, and an open position allowing fluid flow through the auxiliary flow and valve arrangement.

Such shock absorber allows switching between a sportive (stiff) setting and a comfortable (soft) setting, while at the same time providing a good wheel contact with the road surface and preventing the car body from swinging. The first and second auxiliary flow and valve arrangements according to the inventions provide such damping behavior.

In a advantageous embodiment the first auxiliary flow and valve arrangement is configured so as to decrease fluid flow through the first auxiliary flow and valve arrangement with decreasing frequency of the frequency component in the relative piston cylinder movement, which proves to be an effective manner to achieve the desired behavior on outward movement.

In an effective embodiment the first auxiliary flow and valve arrangement comprises a first auxiliary flow channel connecting the first and second cylinder chambers; a first auxiliary non-return valve arranged in the first auxiliary flow channel such as to allow fluid flow on outward movement and to close off fluid flow on inward movement; a first auxiliary throttling valve arranged in the first auxiliary flow channel; and a first auxiliary regulating arrangement acting on the first auxiliary throttling valve such as to regulate fluid flow to provide the frequency dependent damping behavior.

In an advantageous and effective embodiment the first throttling valve comprises a first auxiliary plate valve closing against a first auxiliary valve seat with a closing force, and the first auxiliary regulating arrangement comprises a movable first auxiliary member on which the first auxiliary plate valve is arranged, a displacement force due to a fluid pressure within the first auxiliary flow channel acting to displace the movable first auxiliary member such as to decrease the closing force of the first auxiliary throttling valve; and a first auxiliary chamber having a variable volume and in restricted fluid flow connection with the first auxiliary flow channel upstream of the first auxiliary throttling valve, another displacement force due to a fluid pressure within the first auxiliary chamber acting to displace the movable first auxiliary member such as to increase the closing force of the first auxiliary throttling valve.

In another advantageous embodiment the first auxiliary regulating arrangement is configured such that an effective surface area on which a fluid pressure within the first auxiliary chamber acts to displace the first auxiliary member decreases with a displacement of the first auxiliary member which increases the closing force of the first auxiliary throttling valve, which assists in providing a gradual closing of the first auxiliary throttling valve.

In an effective embodiment the first auxiliary regulating arrangement comprises a flexible plate providing a wall of the first auxiliary chamber and being arranged on a housing of the first auxiliary flow and valve arrangement and on the movable first auxiliary regulating member such as to present the effective surface area.

Preferably, the first auxiliary flow channel comprises a restriction upstream of the first auxiliary throttling valve and upstream of the connection of the first auxiliary chamber with the first auxiliary flow channel, which assists in achieving the required damping behavior.

Advantageously, the first auxiliary non-return valve and the first auxiliary throttling valve are embodied by a single first auxiliary throttling non-return valve, which allows to employ only one valve for the purpose.

In another advantageous and effective embodiment the second auxiliary flow and valve arrangement is configured so as to have fluid flow through the second auxiliary flow and valve arrangement increase with increasing velocity of the relative piston cylinder movement.

In yet another advantageous embodiment the second auxiliary flow and valve arrangement comprises a second auxiliary flow channel connecting the first and second cylinder chambers; a second auxiliary non-return valve arranged in the second auxiliary flow channel such as to allow fluid flow on inward movement and to close off fluid flow on outward movement; and a second auxiliary throttling valve arranged in the second auxiliary flow channel.

Effectively, the second auxiliary throttling valve comprises a second auxiliary plate valve closing against a second auxiliary valve seat.

Advantageously, the second auxiliary non-return valve and the second auxiliary throttling valve are embodied by a single second auxiliary throttling non-return valve, which allows to employ only one valve for the purpose.

Preferably, the auxiliary flow and valve arrangement additionally comprises an open fluid flow connection on both inward and outward movements to provide a comfortable damping behavior at slow and/or small relative movements of wheel and/or car body.

Effectively, this is achieved when the first and/or second auxiliary flow and valve arrangement additionally comprises an open fluid flow connection on both inward and outward movements.

In another effective embodiment the first and/or second auxiliary plate valve comprises at least one opening allowing fluid flow when the first or second auxiliary plate valve closes against the first or second auxiliary valve seat, respectively.

In an effective embodiment the switchable valve comprises a hollow sleeve that is displaceable in a first part of a switchable valve flow channel, the sleeve having at least one opening in a side wall, which opening is in fluid flow communication with the first part of the switchable valve flow channel, the at least opening being in fluid flow communication with a second part of the switchable valve flow channel in the open position of the switchable valve so as to allow fluid flow through the switchable valve flow channel, and the at least one opening not being in fluid flow communication with the second part of the switchable valve flow channel in the closed position so as to close off fluid flow through the switchable valve flow channel.

Switching is advantageously achieved by the sleeve being connected to a magnet and coil arrangement constructed and arranged such as to allow switching of the switchable valve between the closed and open positions.

In a compact embodiment the piston comprises the auxiliary flow and valve arrangement such as to act in between the first and second piston sides; and the switchable valve.

In a further compact embodiment the piston comprises the primary flow and valve arrangement such as to act in between the first and second piston sides.

BRIEF DESCRIPTION OF THE DRAWINGS

The invention will further be explained with reference to the accompanying drawings in which like or same reference symbols denote like, same or corresponding parts, and in which.

DETAILED DESCRIPTION OF EMBODIMENTS

Figure 1:
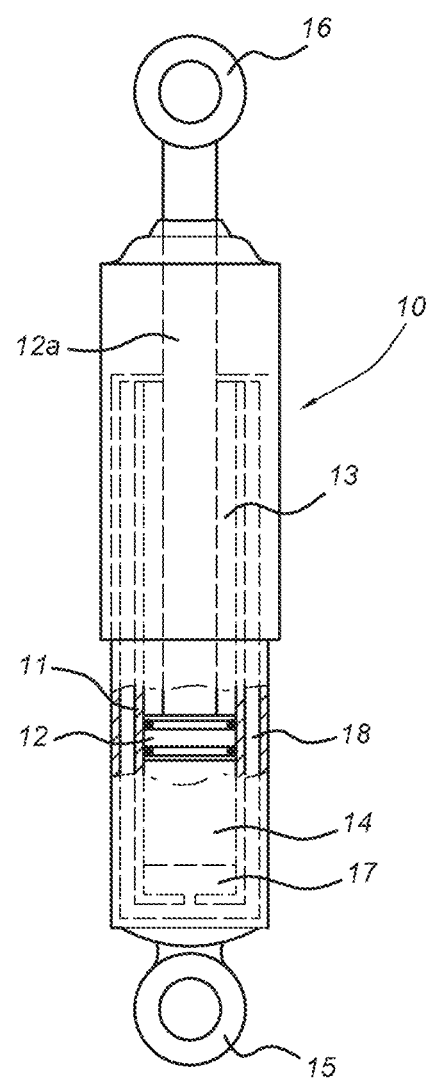
FIG. 1 shows an embodiment of a shock absorber according to the invention.

A shock absorber 10 is shown in FIG. 1 and comprises a cylinder 11 and a piston 12 displaceable in the cylinder along a cylinder wall. The piston seals against the cylinder wall and divides the cylinder in a first chamber 13 and a second chamber 14. In the drawings the first chamber 13 is shown as the upper chamber and the second chamber 14 as the lower chamber, but for the purposes of the invention the first chamber may also be the lower chamber and the second chamber the upper chamber. A cylinder attachment 15 is connected to the cylinder and a piston attachment 16 is connected to the piston 12. A piston rod 12a extends as a part of the piston 12 to the piston attachment 16. The piston and cylinder attachments are arranged for attachment to parts of a vehicle that can move with respect to one another in order to damp their relative movement. Both attachments move towards one another in an inward movement and away from one another in an outward movement. The vehicle may generally be a car, but can also be another vehicle like a train. Movements of the car body with respect to a wheel are damped by a damper as disclosed when the car is travelling over a surface like a road surface.

A fluid, not shown as such in the drawings, is contained in the cylinder chambers 13, 14 and can move in between cylinder chambers through flow and valve arrangements provided in and/or on the piston 12 according to the embodiments shown in FIGS. 1, 2, 2a and 2b. The fluid can be a liquid, such as oil, or a gas, such as air. The embodiment of FIG. 1 is also shown to have a bottom flow and valve arrangement 17, also referred to as shortly a bottom valve, which connects second cylinder chamber 17 with a third chamber 18. The third chamber 18 is in the embodiment of FIG. 1 provided around cylinder 11 to provide a so-called twin tube type of shock absorber. The bottom valve 17 and third chamber 18 add further characteristics to the damping behavior of the shock absorber, but can also be dispensed with. In the latter case a so-called mono tube type of shock absorber would result. FIG. 3 shows an alternative embodiment of a shock absorber according to the invention, in which bottom valve 17 and third chamber 18 are arranged below second cylinder chamber 14 within one cylinder housing.

Figure 2:
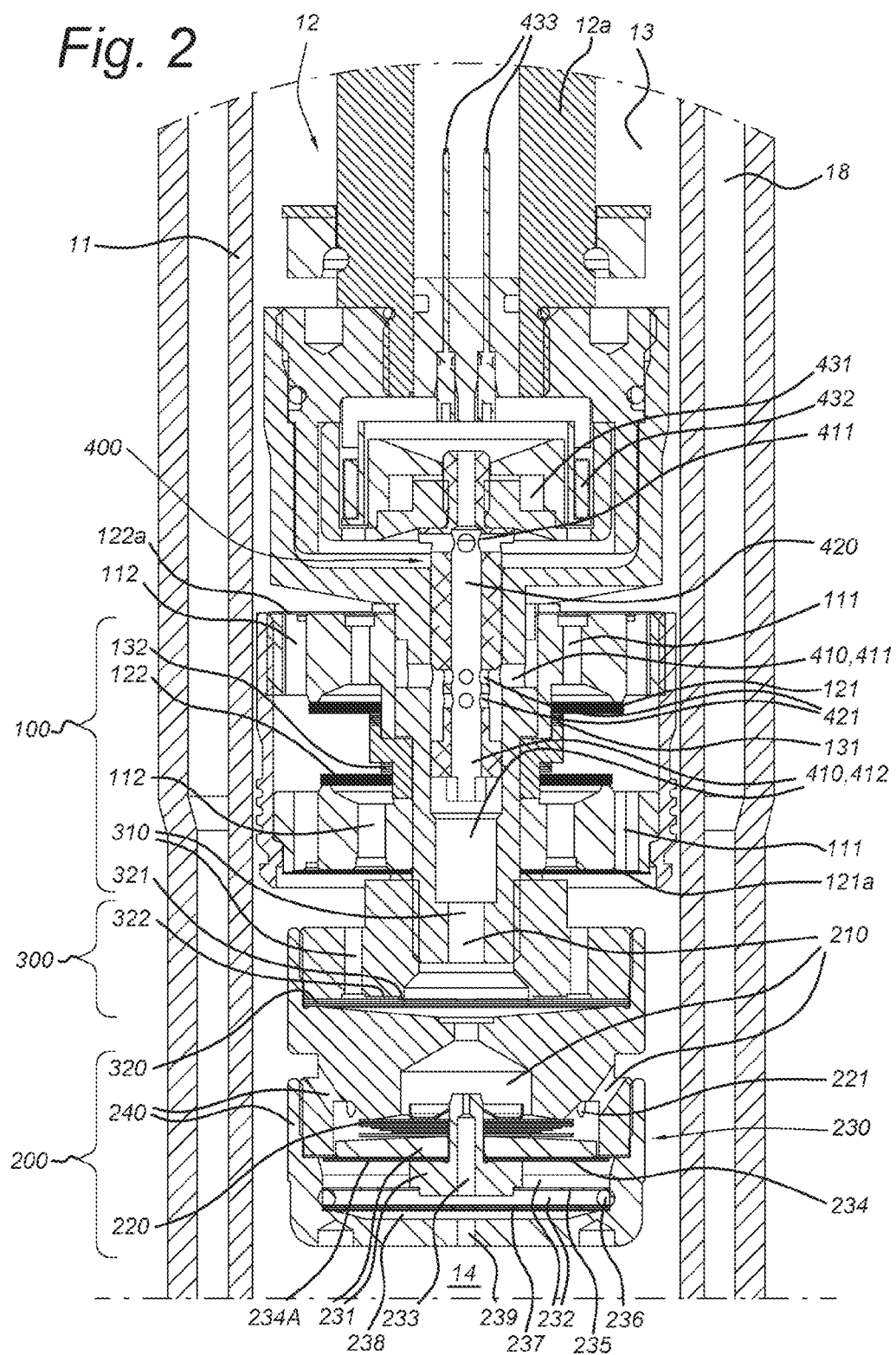
FIG. 2 shows the piston of the shock absorber of FIG. 1 in more detail.
Figure 3:
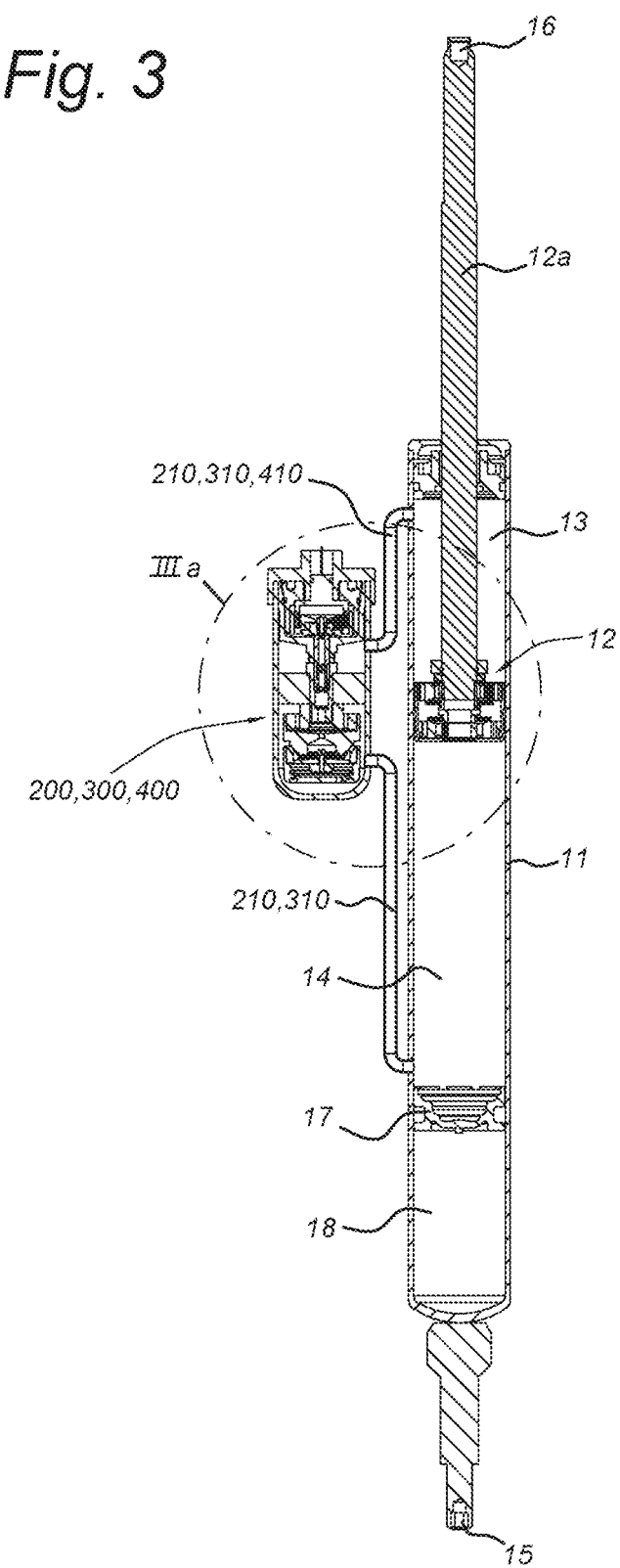
FIG. 3 shows an alternative embodiment of the shock absorber according to the invention.
Figure 3A:
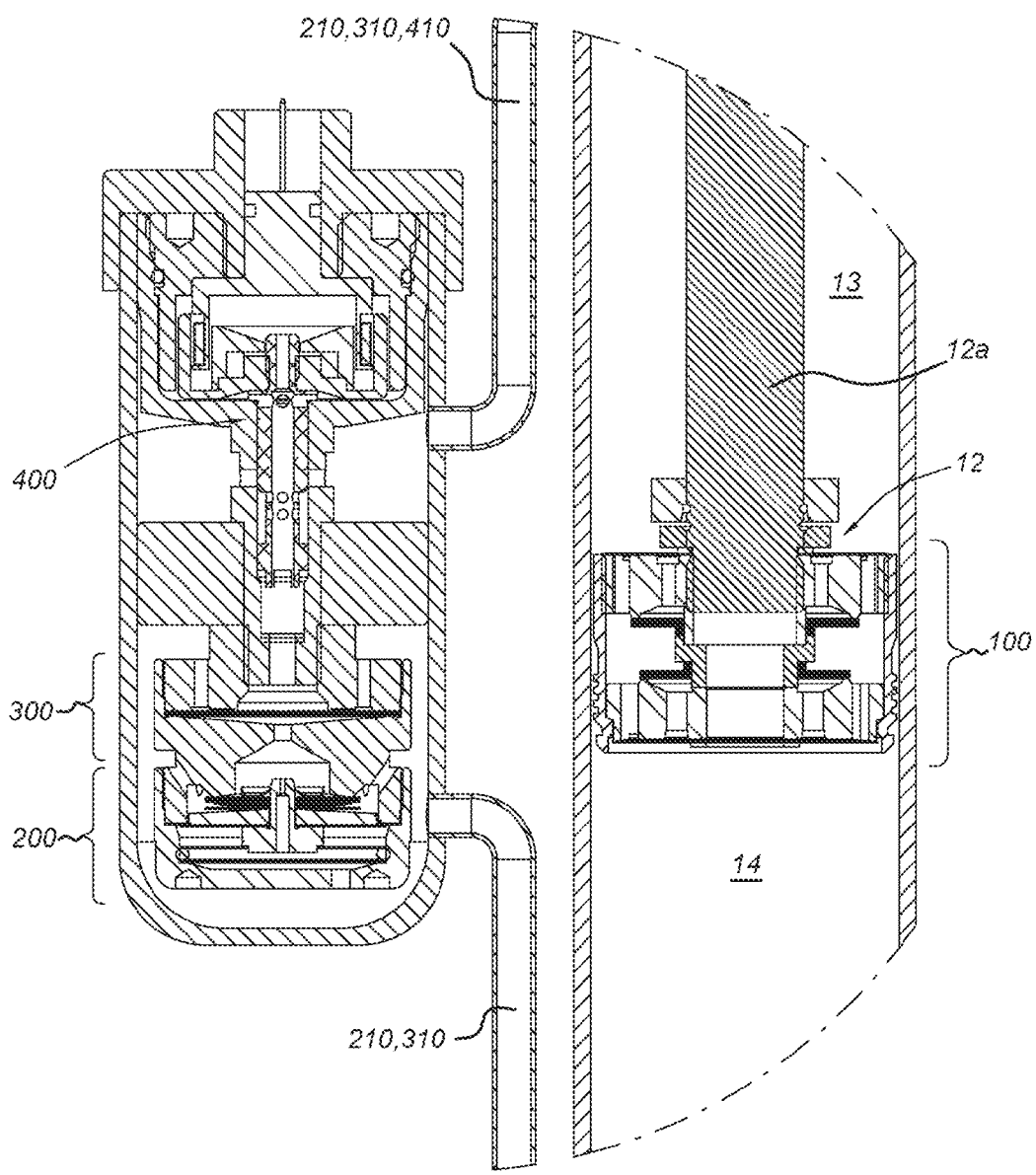
FIG. 3*a* shows the auxiliary flow and valve arrangement and the switchable valve of the embodiment of FIG. 3 in more detail.

A primary flow and valve arrangement 100 is in the embodiment of FIG. 1 provided in the piston and comprises flow channels 111, 112 between opposing first and second sides of the piston 12, as is shown in FIG. 2. A first piston side is in contact with the first cylinder chamber 13 and a second piston side is in contact with the second cylinder chamber 14. The flow channels 111, 112 allow fluid flow in between the first and second cylinder chambers 13, 14. A non-return and throttling valve 121 and a non-return valve 121a close off flow channels 111 at the side of the second flow chamber 14 to only allow fluid flow from first to second cylinder chamber upon outward movement. Spring 131 pretensions valve 121 into a closed position. A non-return and throttling valve 122 and a non-return valve 122a close off flow channels 112 at the side of the first flow chamber 13 to only allow fluid flow from second to first cylinder chamber upon inward movement. Spring 132 pretensions valve 122 into a closed position. The primary flow and valve arrangement is dimensioned such that its damping behavior can be characterized as relatively stiff or sportive. The embodiment of the of the primary flow and valve arrangement disclosed is an example only. The invention is not restricted to any type of primary flow and valve arrangement. The primary flow and valve arrangement might also act in one direction only. In the embodiment shown, the primary flow and valve arrangement is provided in the piston, but it may also be provided at another suitable position in between cylinder chamber 13, 14.

The shock absorber further comprises an auxiliary flow and valve arrangement that comprises a first auxiliary flow and valve arrangement 200 and a second auxiliary flow and valve arrangement 300. The auxiliary flow and valve arrangement is in the embodiment of FIG. 2 provided on the piston, but may also be provided at another suitable position. The first auxiliary flow arrangement 200 and second auxiliary flow arrangement 300 have first and second auxiliary flow channels 210 and 310, respectively, that on side connect to the second cylinder chamber 14 and at the other side to flow channel 410 that connects to first cylinder chamber 13. Both first and second auxiliary flow channels 210 and 310 therefore each connect the first and second cylinder chambers 13, 14.

A switchable valve 400 is provided in flow channel 410. The switchable valve can be switched between a closed position in which fluid flow through flow channel 410, and therefore through the auxiliary flow and valve arrangement, is closed off, and an open position in which fluid flow through flow channel 410, and therefore through the auxiliary flow and valve arrangement, is allowed (enabled). FIG. 2 shows the switchable valve 400 in the open position. In a closed position the switchable valve 400 disables any fluid flow through the auxiliary flow and valve arrangement and therefore disables the auxiliary flow and valve arrangement. Only the primary flow and valve arrangement 100 is active in a closed position of switchable valve 400, providing a relatively stiff or sportive damping behavior. In an open position the switchable valve enables the auxiliary flow and valve arrangement 200, 300, which is designed to have a softer or more comfortable damping behavior than the primary flow and valve arrangement 100. The damping behavior of the shock absorber 10 will then predominantly be governed by the damping behavior of the auxiliary flow and valve arrangement, which is relatively soft or comfortable. In this fashion one can switch between a stiff (sportive) setting and a soft (comfortable) setting.

The first auxiliary flow and valve arrangement 200 only acts in an outward movement of the cylinder and piston attachments 15, 16 and is configured and dimensioned such that it is relatively soft or comfortable with respect to the behavior of the primary flow and valve arrangement. Moreover, the damping behavior of the first auxiliary flow and valve arrangement 200 has a frequency dependency in which fluid flow through the first auxiliary flow and valve arrangement is dependent on a frequency component in a relative piston cylinder movement of cylinder attachment and piston attachment with respect to one another.

The first auxiliary flow and valve arrangement is configured such that fluid flow through the first auxiliary flow and valve arrangement decreases with decreasing frequency of the frequency component in the relative piston cylinder movement. The first auxiliary flow and valve arrangement acts in a direction keeping the wheels of a car (vehicle) in good contact with the road (supporting surface). At higher frequency components the damping behavior of the first auxiliary flow and valve arrangement is chosen to be more or less linear in which a fluid flow through the first auxiliary flow and valve arrangement is more or less linear dependent on the relative velocity between cylinder and piston attachments 15, 16. Relatively less damping is thus provided which provides a good contact of the wheel with the road. At lower frequency components the damping behavior of the first auxiliary flow and valve arrangement is chosen to be relatively stiff to give enough damping to provide a decent driving behavior of the car body. At lower frequencies relatively more damping is thus provided than at relatively higher frequencies, so less damping at relatively fast movements of wheel with respect to car body and more damping at relatively slow movements of wheel with respect to car body.

The first auxiliary flow and valve arrangement 200 comprises a first auxiliary flow channel 210 that provides, together with flow channel 410, a connection between first and second cylinder chamber 13, 14. A first auxiliary non-return valve 220 is arranged in first auxiliary flow channel 210 such as to only allow fluid flow from first cylinder chamber 13 to second cylinder chamber 14 on outward movement. The valve 220 also acts as a throttling valve and thus doubles as a throttling non-return valve 220 to throttle a fluid flow passing the valve. The non-return and throttling functions may also be embodied by separate valves. The first auxiliary throttling non-return valve 220 is embodied as a plate valve which closes against a first auxiliary valve seat 221 with a closing force. Plate valve 220 may comprise one or more plates. A plate valve consisting of multiple plates may be referred to as a plate pack. The first auxiliary throttling non-return valve 220 as such opens further on a larger pressure differences across and larger fluid flows through the valve, and can be configured to provide, as such, a substantially linear dependency on fluid flow through the valve.

However, the first auxiliary flow and valve arrangement 200 further comprises a first auxiliary regulating arrangement 230 that acts on the first auxiliary throttling non-return valve 220 to vary its closing force. Flow and valve arrangement 200 is arranged to adjust the closing force of valve 220 in dependency of a frequency component in the relative piston cylinder movement of cylinder attachment (15) and piston attachment (16) with respect to one another.

The first auxiliary regulating arrangement comprises a movable first auxiliary member 231 on which the first auxiliary plate valve 220 is provided. A fluid pressure within first auxiliary flow channel 210 exerts a displacement force on the movable member 231 to displace movable member 231 in a downward direction in FIG. 2, which results in a decrease of the closing force of plate valve 220. Plate valve 220 would therefore open more easily at increasing pressure difference across the valve. Such pressure increase occurs at outward movement while switchable valve 400 is in the open position.

First auxiliary regulating arrangement further comprises a first auxiliary chamber 232 which has a variable volume and is in fluid connection with the first auxiliary flow channel 220 upstream of the plate valve 220. A fluid pressure within the chamber 232 exerts a displacement force on the movable member 231 to displace movable member 231 in an upward direction in FIG. 2, which results in an increase of closing force of plate valve 220. Plate valve 220 would therefore open less easily at increasing pressure in chamber 232. Chamber 232 is in fluid connection with first auxiliary flow channel through regulating flow channel 233 that provides a restriction to the fluid flow through the channel. A pressure increase in flow channel 210 therefore provides for a pressure increase in chamber 232 with a delay. The time constant concerned determines the frequency dependency of first auxiliary flow and valve arrangement 200. The specific design and dimensioning of the various parts constituting first auxiliary flow and valve arrangement 200 determine such time constant. The design may be made more complex to have more than one time constant and/or a varying effective time constant determining the frequency dependency.

Figure 2A:
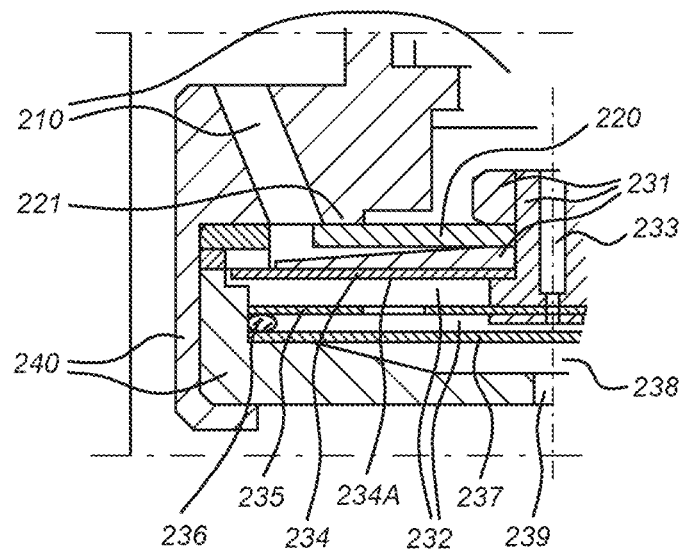
FIGS. 2*a* and 2*b* show the first auxiliary flow and valve arrangement of the embodiment of FIG. 2 schematically in more detail in positions corresponding to a relatively high frequency and a relatively low frequency, respectively, of frequency components in the relative piston cylinder movement.

A flexible plate 234 bounds chamber 232 at an upper side in FIG. 2 and is arranged lying against movable member 231 in the position of movable member 231 as shown in FIG. 2 and in more detail in FIG. 2a. When movable member 231 is displaced upwards in FIG. 2, as is shown in detail in FIG. 2b, the contact surface of flexible plate 234 with movable member 231 decreases since flexible plate 234 is arranged on both movable member 231 and housing 240 of the first auxiliary flow and valve arrangement 200. Therefore a displacement force due to fluid pressure in chamber 232 decreases since the displacement force is dependent on both the fluid pressure and the contact surface or effective surface area 234A (a force is equal to pressure times surface area). This provides gradual closing of plate valve 220 and influences the effective time constant governing the frequency dependency. The actual displacement force acting on movable member and the resulting displacement of movable member 231 is dependent on fluid pressures and effective surface areas on which those pressures are exerted on flow channel and chamber sides of the movable member.

Figure 2B:
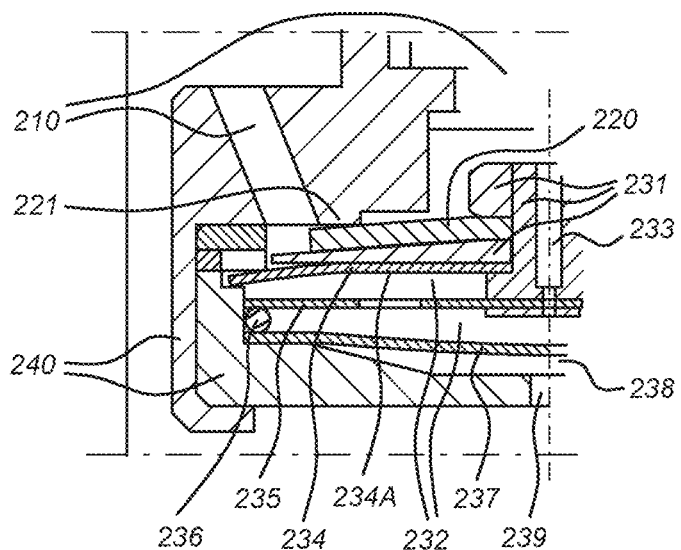

Regulating arrangement 230 further comprises, in the embodiment shown, a (semi-) flexible or rigid plate 235 within chamber 232, which plate 235 is provided with one or more openings (which may restrict fluid flow) allowing fluid communication between upper and lower parts of chamber 232. Fluid flows through regulating channel 233 into lower part of chamber 232 and subsequently into upper part of chamber 232. Plate 235 rests at its outer circumferential edge on a flexible O-ring 236. The arrangement of plate 235 and O-ring 236 provides a pretensioning force on plate valve 220. Chamber 232 is at its bottom side in FIGS. 2, 2a and 2b bound by (semi-) flexible plate 237, which will deform with a pressure difference across plate 237. Another chamber 238 is bound by plate 237 and housing 240. Chamber 238 opens through opening 239, which restricts fluid flow, into second cylinder chamber 14. The arrangement of plate 235 with openings, O-ring 236, plate 237, chamber 238 and opening 239 further effects the effective time constant(s) and frequency dependency of first auxiliary flow and valve arrangement 230. Additionally, a valve might be provided in or over opening 239. Alternatively, a restrictive opening (with or without valve) may be provided between chamber 232 and second cylinder chamber 14. Those and other measures also will influence the effective time constant(s) and frequency dependency of the first auxiliary flow and valve arrangement 230. Alternative embodiments of a first auxiliary flow and valve arrangement 230 are, for instance, disclosed in WO 03/040586 A, which is incorporated herein by reference. FIGS. 2a and 2b show the first auxiliary flow and valve arrangement in positions corresponding to a relatively high frequency and a relatively low frequency, respectively, of frequency components in the relative piston cylinder movement The second auxiliary flow and valve arrangement 300 only acts in an inward movement of the cylinder and piston attachments 15, 16 and is also configured and dimensioned such that it is relatively soft or comfortable with respect to the behavior of the primary flow and valve arrangement 100. The damping behavior of the second auxiliary flow and valve arrangement 200 has a linear dependency in which a fluid flow through the second auxiliary flow and valve arrangement is substantially linear dependent on a velocity of a relative piston cylinder movement of cylinder attachment and piston attachment with respect to one another. A large fluid flow will occur at a large pressure difference across the second flow and valve arrangement 200, which will be due to a rapid inward movement of a wheel with respect to the car body when, for instance, the wheel encounters a bump on the road surface while driving. It allows the wheel to rapidly adjusts its position with respect to the car body, while keeping the car body relatively uninfluenced by the bump encountered, which is experienced as comfortable by car driver and passengers.

The second auxiliary flow and valve arrangement 300 comprises a second auxiliary flow channel 310 that provides, together with flow channel 410, a connection between first and second cylinder chamber 13, 14. A second auxiliary non-return valve 320 is arranged in second auxiliary flow channel 310 such as to only allow fluid flow from second cylinder chamber 14 to first cylinder chamber 13 on inward movement. The valve 320 also acts as a throttling valve and thus doubles as a throttling non-return valve 320 to throttle a fluid flow passing the valve. The non-return and throttling functions may also be embodied by separate valves. The second auxiliary throttling non-return valve 320 is embodied as a plate valve which closes against a second auxiliary valve seat 321 with a closing force. Plate valve 320 may comprise one or more plates. In the embodiment of FIG. 2 the plate valve 320 is ring-shaped. The ring shape of plate valve 320 leaves the central area open, which is not very clearly visible in the figure, to allow fluid connection of the first auxiliary flow and valve arrangement 200 with first cylinder chamber 13.

In the embodiment disclosed in relation to FIG. 2 the second auxiliary flow and valve arrangement 300 is provided in between primary flow and valve arrangement 100 and first auxiliary flow and valve arrangement 200, which is a convenient position in the embodiment disclosed. The open central area of second auxiliary plate valve 320 allows fluid flow towards and from first auxiliary flow and valve arrangement 200. The second auxiliary flow and valve arrangement 300 may also be provided at another position.

In a situation without pressure difference across auxiliary flow and valve arrangement 200, 300 the valves 220 and 320 close with a pretension against their respective valve seats 221, 321. It requires some pressure difference to overcome the pretension. Large pressure difference will generally occur at higher car speeds and/or larger relative movements of wheel and car body (i.e. cylinder and piston attachments 15, 16) with respect to one another. To provide a comfort setting in this range the auxiliary flow and valve arrangement is provided with an open or constant fluid connection between first and second cylinder chambers 13, 14, provided the switchable valve is in the open position. Such open or constant fluid connection may be provided separately, or in one or both of the first and second auxiliary flow and valve arrangements 200, 300. Due to the more complicated construction of the first auxiliary flow and valve arrangement 200 (also due to the more extreme forces its components will experience in practice) the open or constant fluid connection is most easily and effectively provided in the second auxiliary flow and valve arrangement 300. To this end the plate valve comprises one or more openings 325, also referred to as bleed holes, that provide an open connection across the valve 320 for both inward and outward movements of cylinder and piston attachments 15, 16 with respect to one another.

The switchable valve 400 comprises a hollow cylindrical sleeve 420 arranged in a switchable valve flow channel 410 that is part of the first and second auxiliary flow channels 210, 310. The sleeve 420 has openings 421 in its cylindrical side wall, which are in fluid communication with a first part 411 of the switchable valve flow channel 410. Top and bottom ends of the cylindrical hollow sleeve 420 are open. In an open position of the switchable valve, as is shown in FIG. 2, the openings 421 are in fluid communication with a second part 412 of the switchable valve flow channel 410. In the open position the switchable valve 400 provides fluid communication between the first cylinder chamber 13 and the auxiliary flow and valve arrangement 200, 300. Since the auxiliary flow and valve arrangement is in fluid communication with the second cylinder chamber 14 a fluid flow through the auxiliary flow and valve arrangement is enabled when the switchable valve 400 is in the open position. The switchable valve can be switched to a closed position, in which the openings 421 in the sleeve 420 are not in fluid communication with the second part 412 of the switchable valve flow channel 410. The openings in the sleeve 420 also provide for a restriction to the fluid flow through the first and second auxiliary flow channels, which is effective in achieving the required damping behavior. Switching occurs by move sleeve 420 up or down along flow channel 410.

To allow switching the sleeve 420 is connected to a magnet and coil arrangement having a permanent magnet 431 attached to the sleeve. The magnet is arranged within a coil 432 that is electrically connected to pins 433. When connected to an appropriate electrical source an electrical current can be provided through the coil. Applying a current or not through the coil can switch the valve 400 between open and closed positions. Alternatively, providing a current in opposite directions through the coil can switch the valve 400 between open and closed positions. Various configurations of the magnet and coil arrangement, as well as other arrangements, can be envisaged to drive the switchable valve between closed and open positions. Some further magnet and coil arrangements are disclosed in WO 2011/040808 A, which is incorporated herein by reference.

FIG. 3 shows an embodiment of the shock absorber according to the invention, in which the first and second auxiliary flow and valve arrangements 200, 300 and switchable valve 400 are not provided in or on the piston, but alongside the cylinder 11. The first and second auxiliary flow channels connect to top and bottom regions of the first and second cylinder chambers 13, 14, respectively. The first and second auxiliary flow and valve arrangements 200, 300 and switchable valve 400 are configured as is disclosed with respect to the embodiment of FIG. 2, but may be embodied in another fashion as well. Various other embodiments of the invention will be apparent to the skilled person when having read the above disclosure in connection with the drawings, all of which as within the scope of the invention and accompanying claims.

The invention claimed is:
1. A shock absorber (10) comprising:
   a cylinder (11);
   a piston (12) movable within the cylinder along a cylinder wall, the piston sealing against the cylinder wall and dividing the cylinder into a first cylinder chamber (13) at a first piston side of the piston and a second cylinder chamber (14) at a second piston side of the piston, the second piston side opposing the first piston side, and the first and second cylinder chambers being filled with a fluid;
   a cylinder attachment (15) constructed and arranged for attachment to a first part of a vehicle and connected to the cylinder (11);
   a piston attachment (16) constructed and arranged for attachment to a second part of a vehicle and connected to the piston (12), the piston attachment and cylinder attachment being arranged to move towards one another on an inward movement and away from one another on an outward movement;
   a primary flow and valve arrangement (100) constructed and arranged to allow fluid flow in between the first and second cylinder chambers (13, 14) such as to provide a primary damping behavior of the shock absorber on inward and/or outward movement;
   an auxiliary flow and valve arrangement (200, 300) constructed and arranged to allow fluid flow in between the first and second cylinder chambers (13, 14) such as to provide an auxiliary damping behavior of the shock absorber on outward and inward movement, the auxiliary flow and valve arrangement comprising a first auxiliary flow and valve arrangement (200) constructed and arranged to allow fluid flow in between the first and second cylinder chambers (13, 14) such as to provide a first auxiliary damping behavior of the shock absorber on outward movement, the first auxiliary damping behavior showing a frequency dependency in which a fluid flow through the first auxiliary flow and valve arrangement is dependent on a frequency component in a relative piston cylinder movement of cylinder attachment (15) and piston attachment (16) with respect to one another;

a second auxiliary flow and valve arrangement (300) constructed and arranged to allow fluid flow in between the first and second cylinder chambers (13, 14) such as to provide a second auxiliary damping behavior of the shock absorber on inward movement, the second auxiliary damping behavior showing a substantially linear dependency in which a fluid flow through the second auxiliary flow and valve arrangement is substantially linear dependent on a velocity of the relative piston cylinder movement; and a switchable valve (400) that can be switched between a closed position closing off fluid flow through the auxiliary flow and valve arrangement, and an open position allowing fluid flow through the auxiliary flow and valve arrangement.

2. The shock absorber according to claim 1, wherein the first auxiliary flow and valve arrangement (200) is configured so as to decrease fluid flow through the first auxiliary flow and valve arrangement with decreasing frequency of the frequency component in the relative piston cylinder movement.

3. The shock absorber according to claim 1, wherein the first auxiliary flow and valve arrangement (200) comprises:

a first auxiliary flow channel (210) connecting the first and second cylinder chambers (13, 14);

a first auxiliary non-return valve (220) arranged in the first auxiliary flow channel (210) such as to allow fluid flow on outward movement and to close off fluid flow on inward movement;

a first auxiliary throttling valve (220) arranged in the first auxiliary flow channel (210); and a first auxiliary regulating arrangement (230) acting on the first auxiliary throttling valve (220) such as to regulate fluid flow to provide the frequency dependent damping behavior.

4. The shock absorber according to claim 3, wherein the first throttling valve (220) comprises:

a first auxiliary plate valve (220) closing against a first auxiliary valve seat (221) with a closing force, and the first auxiliary regulating arrangement (230) comprises a movable first auxiliary member (231) on which the first auxiliary plate valve (220) is arranged, a displacement force due to a fluid pressure within the first auxiliary flow channel (210) acting to displace the movable first auxiliary member (231) such as to decrease the closing force of the first auxiliary throttling valve (220); and a first auxiliary chamber (232) having a variable volume and in restricted fluid flow connection (233) with the first auxiliary flow channel (210) upstream of the first auxiliary throttling valve (220), another displacement force due to a fluid pressure within the first auxiliary chamber (232) acting to displace the movable first auxiliary member (231) such as to increase the closing force of the first auxiliary throttling valve (220).

5. The shock absorber according to claim 4, wherein the first auxiliary regulating arrangement (230) is configured such that an effective surface area (234A) on which a fluid pressure within the first auxiliary chamber (232) acts to displace the first auxiliary member (231) decreases with a displacement of the first auxiliary member which increases the closing force of the first auxiliary throttling valve (220).

6. The shock absorber according to claim 5, wherein the first auxiliary regulating arrangement (230) comprises a flexible plate (234) providing a wall of the first auxiliary chamber (232) and being arranged on a housing (240) of the first auxiliary flow and valve arrangement (200) and on the movable first auxiliary member (231) such as to present the effective surface area (234A).

7. The shock absorber according to claim 4, wherein the auxiliary flow and valve arrangement additionally comprises an open fluid flow connection on both inward and outward movements.

8. The shock absorber according to claim 7, wherein the first and/or second auxiliary flow and valve arrangement (200, 300) additionally comprises an open fluid flow connection on both inward and outward movements.

9. The shock absorber according to claim 8, wherein the first and/or a second auxiliary plate valve (220, 320) comprises at least one opening (322) allowing fluid flow when the first or second auxiliary plate valve closes against the first or a second auxiliary valve seat (221, 321), respectively.

10. The shock absorber according to claim 3, wherein the first auxiliary flow channel (210) comprises a restriction upstream of the first auxiliary throttling valve (220) and upstream of the connection (233) of the first auxiliary chamber (232) with the first auxiliary flow channel (210).

11. The shock absorber according to claim 3, wherein the first auxiliary non-return valve and the first auxiliary throttling valve are embodied by a single first auxiliary throttling non-return valve (220).

12. The shock absorber according to claim 1, wherein the second auxiliary flow and valve arrangement (300) is configured so as to have fluid flow through the second auxiliary flow and valve arrangement increase with increasing velocity of the relative piston cylinder movement.

13. The shock absorber according to claim 12, wherein the second auxiliary flow and valve arrangement (300) comprises:

a second auxiliary flow channel (310) connecting the first and second cylinder chambers (13, 14);

a second auxiliary non-return valve (320) arranged in the second auxiliary flow channel (310) such as to allow fluid flow on inward movement and to close off fluid flow on outward movement; and a second auxiliary throttling valve (320) arranged in the second auxiliary flow channel (310).

14. The shock absorber according to claim 13, wherein the second auxiliary throttling valve (320) comprises a second auxiliary plate valve (320) closing against a second auxiliary valve seat (321).

15. The shock absorber according to claim 13, wherein the second auxiliary non-return valve and the second auxiliary throttling valve are embodied by a single second auxiliary throttling non-return valve (320).

16. The shock absorber according to claim 1, wherein the switchable valve (400) comprises a hollow sleeve (420) that is displaceable in a first part (411) of a switchable valve flow channel (410), the sleeve having at least one opening (421) in a side wall, which opening is in fluid flow communication with the first part (411) of the switchable valve flow channel (410), the at least one opening (421) being in fluid flow communication with a second part (412) of the switchable valve flow channel (410) in the open position of the switchable valve so as to allow fluid flow through the switchable valve flow channel, and the at least one opening (421) not being in fluid flow communication with the second part (412) of the switchable valve flow channel (410) in the closed position so as to close off fluid flow through the switchable valve flow channel.

17. The shock absorber according to claim 16, wherein the sleeve (420) is connected to a magnet and coil arrangement (430) constructed and arranged such as to allow switching of the switchable valve (400) between the closed and open positions.

18. The shock absorber according to claim 1, wherein the piston (12) comprises:
   the auxiliary flow and valve arrangement (200, 300) such as to act in between the first and second piston sides; and
   the switchable valve (400).

19. The shock absorber according to claim 1, wherein the piston (12) comprises the primary flow and valve arrangement (100) such as to act in between the first and second piston sides.

20. The shock absorber according to claim 1, wherein the auxiliary flow and valve arrangement additionally comprises an open fluid flow connection on both inward and outward movements.

\* \* \* \* \*